US010438086B2

(12) United States Patent
Guo et al.

(10) Patent No.: US 10,438,086 B2
(45) Date of Patent: Oct. 8, 2019

(54) IMAGE INFORMATION RECOGNITION PROCESSING METHOD AND DEVICE, AND COMPUTER STORAGE MEDIUM

(71) Applicant: Tencent Technology (Shenzhen) Company Limited, Shenzhen, Guangdong (CN)

(72) Inventors: Dean Guo, Shenzhen (CN); Xiangyu Song, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/729,935

(22) Filed: Oct. 11, 2017

(65) Prior Publication Data
US 2018/0225542 A1 Aug. 9, 2018

Related U.S. Application Data

(63) Continuation of application No. PCT/CN2016/080564, filed on Apr. 28, 2016.

(30) Foreign Application Priority Data

Sep. 30, 2015 (CN) .......................... 2015 1 0642022

(51) Int. Cl.
*G06T 7/90* (2017.01)
*G06K 9/46* (2006.01)
(Continued)

(52) U.S. Cl.
CPC ......... *G06K 9/4642* (2013.01); *G06K 9/4652* (2013.01); *G06K 9/6215* (2013.01); *G06K 9/68* (2013.01)

(58) Field of Classification Search
CPC .. G06K 9/4642; G06K 9/4652; G06K 9/6215; G06K 9/68
See application file for complete search history.

(56) References Cited

U.S. PATENT DOCUMENTS 7,221,395 B2     5/2007  Kinjo
7,888,621 B2 *   2/2011  Abrott .................... B23K 26/03
                                                  219/121.69
(Continued)

FOREIGN PATENT DOCUMENTS

CN    103617625 A    3/2014
CN    103793697 A    5/2014
(Continued)

OTHER PUBLICATIONS

International Search Report in international application No. PCT/CN2016/080564, dated Aug. 8, 2016.
(Continued)

*Primary Examiner* — Gregory M Desire
(74) *Attorney, Agent, or Firm* — Oppedahl Patent Law Firm LLC

(57) ABSTRACT

An image information recognition processing method, device and a computer storage medium are provided. A first reference image and an image to be detected are acquired. Nth interception or cutting processing on the image to be detected is performed in a specified direction to obtain an Nth sub-image according to a first preset rule. First attribute values and/or second attribute values of the first reference image and the Nth sub-image are acquired respectively, the first attribute values being configured to represent color distribution information of the images and the second attribute values being configured to represent fingerprint information of the images. When the first attribute value and/or second attribute value of the Nth sub-image and the corresponding attribute value(s) of the first reference image meet a predetermined condition, it is recognized that the image to be detected to which the Nth sub-image belongs is matched with the first reference image.

17 Claims, 9 Drawing Sheets

(51) Int. Cl.
*G06K 9/68* (2006.01)
*G06K 9/62* (2006.01)

(56) References Cited

U.S. PATENT DOCUMENTS

| | | | |
|---|---|---|---|
| 7,991,189 B2* | 8/2011 | Ohira | G06K 9/4671 |
| | | | 382/100 |
| 8,260,061 B2* | 9/2012 | Hirohata | G06K 9/00577 |
| | | | 382/173 |
| 10,230,907 B2* | 3/2019 | Wang | H04N 5/33 |
| 2002/0001036 A1 | 1/2002 | Kinjo | |
| 2004/0252768 A1 | 12/2004 | Suzuki | |
| 2013/0262505 A1 | 10/2013 | Buckley | |
| 2018/0225542 A1* | 8/2018 | Guo | G06K 9/68 |

FOREIGN PATENT DOCUMENTS

| | | |
|---|---|---|
| CN | 103984776 A | 8/2014 |
| CN | 104217222 A | 12/2014 |
| CN | 104463151 A | 3/2015 |
| CN | 104820996 A | 8/2015 |
| CN | 104881668 A | 9/2015 |

OTHER PUBLICATIONS

Supplementary European Search Report in European application No. 16850067.6, dated Sep. 19, 2018.

Metadata-driven multimedia access,IEEE Signal Processing Magazie,IEEE Service Center, Piscataway,NJ,US,vol. 20,No. 2,Mar. 1, 2003,pp. 40-52,XP011095791,ISSN:1053-5888,DOI:10.1109/MSP.2003.1184338.

English Translation of the Written Opinion of the International Search Authority in international application No. PCT/CN2016/080564, dated Aug. 8, 2016.

Notification of the First Office Action of Chinese application No. 201510642022.2 , dated Apr. 28, 2018.

Zhenjun Tang et al: "Perceptual Image Hashing with Histogram of Color Vector Angles", Dec. 4, 2012 (Dec. 4, 2012), Active Media Technology, Springer Berlin Heidelberg, Berlin, Heidelberg, pp. 237-246, XP047007718, ISBN: 978-3-642-35235-5.

Azhar Hadmi et al.: "Perceptual Image Hashing", www.intechopen.com/books/watermarking-volume-2/perceptual-image-hashing Watermarking, vol. 2 May 16, 2012 (May 16, 2012), ISBN: 978-953-51-0619-7.

Yang Ou et al: "A Survey on Image Hashing for Image Authentication", IEICE Transactions on Information and Systems IEICE Japan, vol. E93-D, No. 5, May 2010 (May 2010), pp. 1020-1030, ISSN:0916-8532.

First Office Action of the Europe application No. 16850067.6, dated Jul. 29, 2019.

\* cited by examiner

IMAGE INFORMATION RECOGNITION PROCESSING METHOD AND DEVICE, AND COMPUTER STORAGE MEDIUM

CROSS REFERENCE TO RELATED APPLICATIONS

This is a continuation application of International Patent Application No. PCT/CN2016/080564, filed on Apr. 28, 2016, which claims priority to Chinese Patent Application No. 201510642022.2 filed on Sep. 30, 2015, the disclosure of which is incorporated by reference herein in its entirety.

BACKGROUND

In the field of image processing, a similar image recognition technology becomes more and more mature. At present, a common image similarity recognition method includes a color distribution histogram CF algorithm and a perceptual hash (phash) algorithm. The CF algorithm has a very high error recognition probability, that is, it is very likely to mistakenly determine an image dissimilar to a reference image to be similar. The phash algorithm may ensure recognition accuracy to a certain extent, but is likely to miss some pictures with relatively high similarities. As can be seen, there is an urgent need of a solution capable of preventing pictures with high similarities from being missed and also ensuring or improving recognition accuracy.

SUMMARY

The embodiments of the present disclosure provide an image information recognition processing method and device, and a computer storage medium, so as to improve recognition accuracy and reduce a probability of missing a similar picture.

The embodiments of the present disclosure provide an image information recognition processing method. A first reference image is acquired. At least one image to be detected is acquired. Nth interception or cutting processing is performed on the image to be detected in at least one specified direction to obtain an Nth sub-image in the at least one image to be detected according to a first preset rule, N being a positive integer. First attribute values and/or second attribute values in the first reference image and the Nth sub-image are acquired respectively, the first attribute values being configured to represent color distribution information of the images and the second attribute values being configured to represent fingerprint information of the images. When the first attribute value and/or second attribute value of the Nth sub-image and the corresponding attribute value(s) of the first reference image meet a predetermined condition, it is recognized that the image to be detected to which the Nth sub-image belongs is matched with the first reference image.

The embodiments of the present disclosure provide an image information recognition processing device including a first acquisition unit, a second acquisition unit, a third acquisition unit and a first recognition unit. The first acquisition unit is configured to acquire a first reference image. The second acquisition unit is configured to acquire at least one image to be detected, and perform Nth interception or cutting processing in at least one specified direction on the image to be detected to obtain an Nth sub-image in the at least one image to be detected according to a first preset rule, N being a positive integer. The third acquisition unit is configured to acquire first attribute values and/or second attribute values in the first reference image and the Nth sub-image respectively, the first attribute values being configured to represent color distribution information of the images and the second attribute values being configured to represent fingerprint information of the images. The first recognition unit is configured to, when the first attribute value and/or second attribute value of the Nth sub-image and the corresponding attribute value(s) of the first reference image meet a predetermined condition, recognize that the image to be detected to which the Nth sub-image belongs is matched with the first reference image.

The embodiments of the present disclosure further provide a computer storage medium having computer-executable instructions stored therein, the computer-executable instructions being configured to execute the abovementioned image information recognition processing method.

According to the image information recognition processing method provided above, the first reference image is acquired; the at least one image to be detected is acquired, and Nth interception or cutting processing in the at least one specified direction is performed on the image to be detected to obtain the Nth sub-image in the at least one image to be detected according to the first preset rule, N being a positive integer; the color distribution information of the images and the fingerprint information of the images in the first reference image and the Nth sub-image are acquired respectively; and when the color distribution information of the Nth sub-image and/or the fingerprint information of the image and the corresponding information of the first reference image meet the predetermined condition, it is determined that the image to be detected to which the Nth sub-image belongs is matched with the first reference image.

The embodiments of the present disclosure start from similarities of the Nth sub-image and the first reference image in terms of the first attribute values, second attribute values and the like. That is, influence of both color distribution conditions of the images and the fingerprint information of the images on image similarity recognition is considered. The embodiments of the present disclosure may effectively improve recognition accuracy and reduce a probability of missing similar pictures.

DETAILED DESCRIPTION

Preferred embodiments of the present disclosure will be described below in detail with reference to the drawings. It should be understood that the preferred embodiments described below are only used to describe and explain the present disclosure and not intended to limit the present disclosure.

Figure 1:
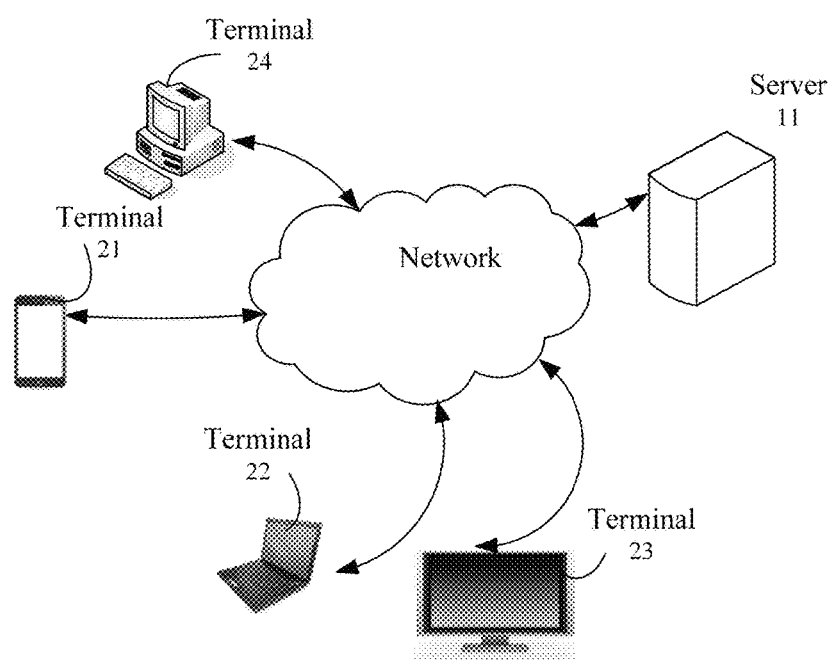
FIG. 1 is schematic diagram illustrating a hardware entity where an image information recognition processing device may be located according to an embodiment of the present disclosure.

FIG. 1 is a schematic diagram illustrating a hardware entity where an image information recognition processing device may be located according to an embodiment of the present disclosure. As shown in FIG. 1, the image information recognition processing device of the embodiment of the present disclosure may be located in a terminal such as a mobile phone 21, a notebook 22, an all-in-one computer 23 and a desktop computer 24, may be located in a server 11, and may also be located in a base station. Of course, the image information recognition processing device of the embodiment of the present disclosure may further be located in another terminal such as a Personal Digital Assistant (PDA) and an electronic reader. There are no limits excessively made. In addition, the terminal, the server or the base station may communicate with another terminal, server or base station in a wireless manner or a wired manner.

The example shown in FIG. 1 is only an architecture example for implementing the embodiments of the present disclosure. The embodiments of the present disclosure are not limited to the structure shown in FIG. 1. Based on such a system architecture, each embodiment of the present disclosure is disclosed.

In the embodiments of the present disclosure, a first reference image is acquired at first, and then certain interception or cutting processing is performed on an image to be detected to obtain a sub-image. When the first reference image and the sub-image have similarities in terms of color distribution information and/or image fingerprint information, the image to be detected is determined as an image similar to the first reference image. The color distribution information of the images is obtained by means of a CF algorithm, and the fingerprint information of the images is obtained by means of a phash algorithm, so that pictures with high similarities may be prevented from being missed, and recognition accuracy may also be ensured or improved.

Figure 2:
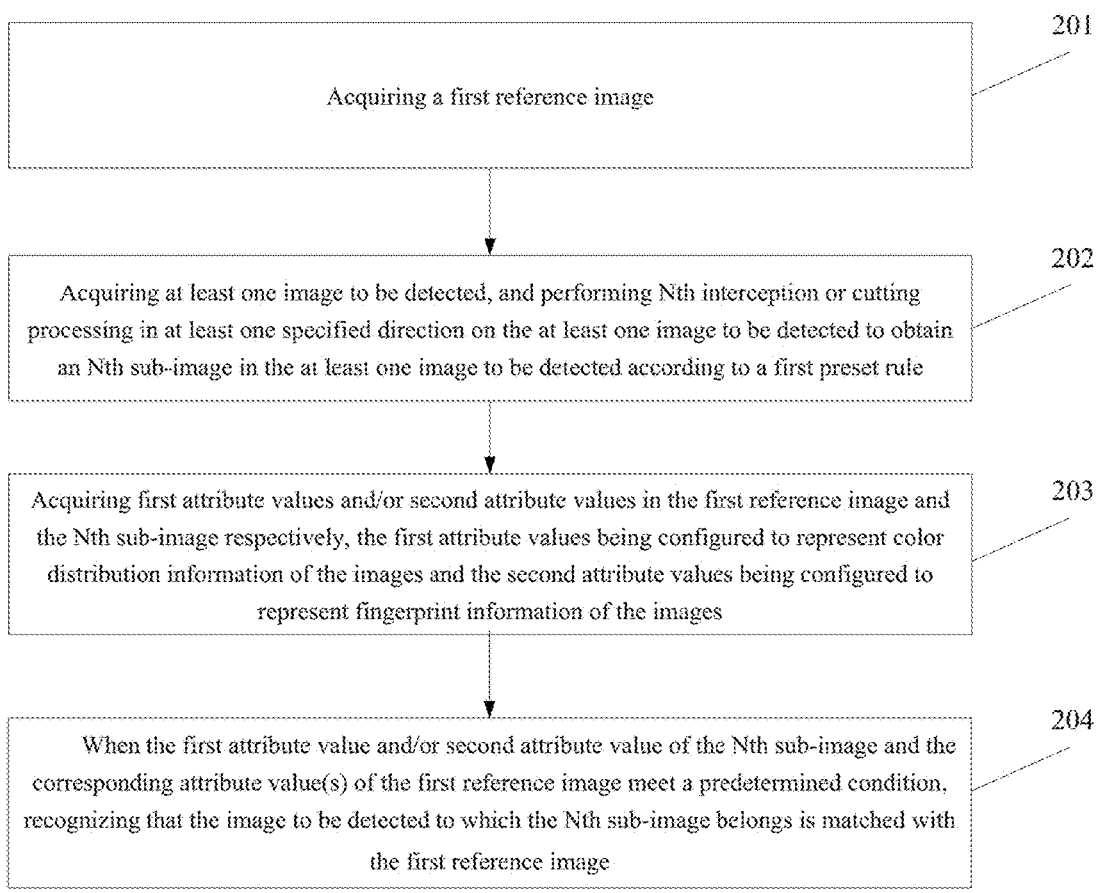
FIG. 2 is an implementation flowchart showing an embodiment of the present disclosure.

FIG. 2 is an implementation flowchart showing an embodiment of the present disclosure. As shown in FIG. 2, the method includes the following steps.

At Step 201, a first reference image is acquired.

During a practical application, a picture with a high similarity with a picture A or part of image of the picture A may be found from other pictures. For example, a picture including a certain object such as a peony flower in the picture A is searched from the other pictures. When the picture with the high similarity with the picture A is intended to be searched from the other pictures, the first reference image is the picture A. When the picture with the high similarity with the part of image such as an image of the peony flower in the picture A is intended to be searched from the other pictures, the first reference image is part of image including the peony flower in the picture A.

In the step, a first predetermined image is determined at first, and then interception or cutting processing is performed on the first predetermined image to obtain the first reference image according to a second preset rule. The second preset rule at least sets a position and size for interception or cutting processing of the first predetermined image. The first predetermined image may be a local picture, a picture shot by a camera, a picture received from another terminal/server or a picture downloaded from the Internet. For example, the first predetermined image may be the abovementioned picture A. According to a usage requirement, the picture A may be wholly intercepted, and may also be partially intercepted. For example, a 200*200-pixel picture A may be intercepted from a position of a pixel point (0, 0) according to a ratio of 1/5 (40 pixels are removed) to obtain a 160*160-pixel picture including pixel points (0, 0)~(160, 160). Alternatively, a 200*200-pixel picture A may be intercepted from a position of a pixel point (5, 5) according to the ratio of 1/5 to obtain a 160*160-pixel picture including pixel points (5, 5)~(165, 165), which is determined according to a practical usage requirement.

At Step 202, at least one image to be detected is acquired, and Nth interception or cutting processing in at least one specified direction on the image to be detected is performed to obtain an Nth sub-image in the at least one image to be detected according to a first preset rule.

Herein, the image to be detected may be a local picture, a picture shot by a camera, a picture received from the other terminal/server or a picture downloaded from the Internet. The first preset rule at least sets a position and size for the Nth interception or cutting processing of the at least one image to be detected. The Nth sub-image and the first reference image have the same size, and N is a positive integer. A size of the image to be detected may be the same as or different from a size of the first predetermined image. The specified direction is a transverse direction and longitudinal direction of the picture. Preferably, interception in the transverse direction may be performed at first. When a sub-image intercepted in the transverse direction is not similar to the first reference image, interception in the longitudinal direction is performed. The size of the Nth sub-image is required to be the same as the size of the first reference image. For example, a picture B includes 200*200 pixels. If the picture is translated by one pixel every time in the transverse direction, interception is performed from a position of a pixel point (0, 0) according to a ratio of 1/5 (200*1/5=40 pixels are removed) to obtain a 160*160-pixel picture, i.e. first sub-image, including pixel points (0, 0)~(160, 160) during first interception. Interception is performed from a position of a pixel point (1, 0) according to the same ratio of 1/5 to obtain a 160*160-pixel picture, i.e. second sub-image, including pixel points (1, 0)~(161, 160) during second interception, and so on.

At Step 203, first attribute values and/or second attribute values in the first reference image and the Nth sub-image are acquired respectively, the first attribute values being configured to represent color distribution information of the images and the second attribute values being configured to represent fingerprint information of the images.

Herein, the first attribute values are color distribution histograms calculated through a CF algorithm, and the second attribute values are the image fingerprint information calculated through a phash algorithm. The color distribution histograms and/or image fingerprint information of the first reference image and the Nth sub-image are calculated. A specific process of calculating the color distribution histograms and the image fingerprint information refers to related descriptions, and will not be elaborated herein.

At Step 204, when the first attribute value and/or second attribute value of the Nth sub-image and the corresponding attribute value(s) of the first reference image meet a predetermined condition, it is recognized that the image to be detected to which the Nth sub-image belongs is matched with the first reference image.

Herein, when the color distribution histogram of the Nth sub-image has a relatively high similarity with the color distribution histogram of the first reference image, and/or an image fingerprint of the Nth sub-image has a relatively high similarity with an image fingerprint of the first reference image, the image to be detected to which the Nth sub-image belongs is determined as an image similar to the first reference image.

In the embodiment of the present disclosure, the first reference image is acquired at first, and then certain interception or cutting processing is performed on the image to be detected to obtain a sub-image. When the first reference image and the sub-image have similarities in terms of the color distribution information and/or the image fingerprint information, the image to be detected is determined as the image similar to the first reference image. The color distribution histograms are obtained by means of the CF algorithm, and the image fingerprint information is obtained by means of the phash algorithm, so that pictures with high similarities may be prevented from being missed, and recognition accuracy may also be ensured or improved.

Figure 3:
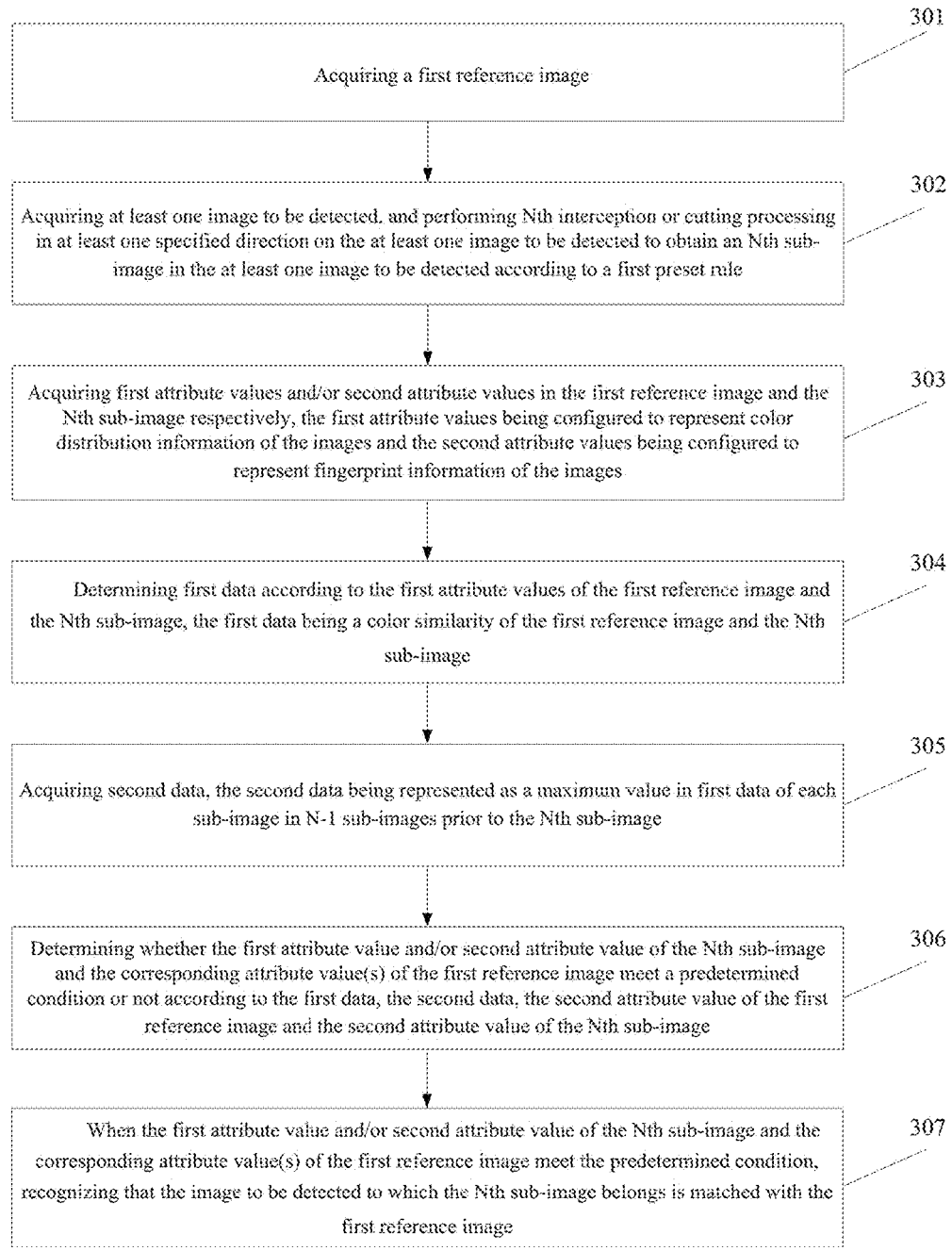
FIG. 3 is an implementation flowchart showing another embodiment of the present disclosure.

FIG. 3 is an implementation flowchart showing another embodiment of the present disclosure. As shown in FIG. 3, the method includes the following steps.

At Step 301, a first reference image is acquired.

During a practical application, a picture with a high similarity with a picture A or part of image of the picture A may be found from other pictures. For example, a picture including a certain object such as a peony flower in the picture A is searched from the other pictures. When the picture with the high similarity with the picture A is intended to be searched from the other pictures, the first reference image is the picture A. When the picture with the high similarity with the part of image such as an image of the peony flower in the picture A is intended to be searched from the other pictures, the first reference image is part of image including the peony flower in the picture A.

In the step, a first predetermined image is determined at first, and then interception or cutting processing is performed on the first predetermined image to obtain the first reference image according to a second preset rule. The second preset rule at least sets a position and size for interception or cutting processing of the first predetermined image. The first predetermined image may be a local picture, a picture shot by a camera, a picture received from another terminal/server or a picture downloaded from the Internet. For example, the first predetermined image may be the abovementioned picture A. According to a usage requirement, the picture A may be wholly intercepted, and may also be partially intercepted. For example, a 200*200-pixel picture A may be intercepted from a position of a pixel point (0, 0) according to a ratio of 1/5 (40 pixels are removed) to obtain a 160*160-pixel picture including pixel points (0, 0)~(160, 160). Alternatively, a 200*200-pixel picture A may be intercepted from a position of a pixel point (5, 5) according to the ratio of 1/5 to obtain a 160*160-pixel picture including pixel points (5, 5)~(165, 165), which is determined according to a practical usage requirement.

At Step 302, at least one image to be detected is acquired, and Nth interception or cutting processing in at least one specified direction on the image to be detected is performed to obtain an Nth sub-image in the at least one image to be detected according to a first preset rule.

Herein, the image to be detected may be a local picture, a picture shot by a camera, a picture received from a terminal/server or a picture downloaded from the Internet. The first preset rule at least sets a position and size for the Nth interception or cutting processing of the at least one image to be detected. The Nth sub-image and the first reference image have the same size, and N is a positive integer. A size of the image to be detected may be the same as or different from a size of the first predetermined image.

The specified direction is a transverse direction and longitudinal direction of the picture. Preferably, interception in the transverse direction may be performed at first. When a sub-image intercepted in the transverse direction is not similar to the first reference image, interception in the longitudinal direction is performed. The size of the Nth sub-image is required to be the same as the size of the first reference image. For example, a picture B includes 200*200 pixels. If the picture is translated by one pixel every time in the transverse direction, interception is performed from a position of a pixel point (0, 0) according to a ratio of 1/5 (200*1/5=40 pixels are removed) to obtain a 160*160-pixel picture, i.e. first sub-image, including pixel points (0, 0)~(160, 160) during first interception. Interception is performed from a position of a pixel point (1, 0) according to the same ratio of 1/5 to obtain a 160*160-pixel picture, i.e. second sub-image, including pixel points (1, 0)~(161, 160) during second interception, and so on.

At Step 303, first attribute values and/or second attribute values in the first reference image and the Nth sub-image are acquired respectively, the first attribute values being configured to represent color distribution information of the images and the second attribute values being configured to represent fingerprint information of the images.

Herein, the first attribute values are color distribution histograms calculated through a CF algorithm, and the second attribute values are the image fingerprint information calculated through a phash algorithm. The color distribution histograms and/or image fingerprint information of the first reference image and the Nth sub-image are calculated. A specific process of calculating the color distribution histograms and the image fingerprint information refers to related descriptions, and will not be elaborated herein.

At Step 304, first data is determined according to the first attribute values of the first reference image and the Nth sub-image, the first data being a color similarity of the first reference image and the Nth sub-image.

Herein, a similarity value of the first reference image and the Nth sub-image in terms of the color distribution histogram is calculated to obtain the first data through a cosine similarity algorithm, and the first data is cached. Of course, the first data may also be obtained through another algorithm.

At Step 305, second data is acquired, the second data being represented as a maximum value in first data of each sub-image in N−1 sub-images prior to the Nth sub-image.

Herein, after first N−1 interceptions are performed on the image to be detected to obtain the first N−1 sub-images, a similarity value of each sub-image in the first N−1 sub-images and the first reference image, after being calculated, is required to be cached for subsequent use. In the step, the first data, which has been cached previously, corresponding to the first N−1 sub-images, is read, and the maximum value therein is calculated as the second data.

At Step 306, it is determined whether the first attribute value and/or second attribute value of the Nth sub-image and the corresponding attribute value(s) of the first reference image meet a predetermined condition or not according to the first data, the second data, the second attribute value of the first reference image and the second attribute value of the Nth sub-image.

In the step, it is determined whether the first data of the Nth sub-image in the second data and the first data of the Nth sub-image is the maximum value or not.

If the first data of the Nth sub-image is not the maximum value, interception or cutting processing in a second specified direction is performed on the at least one image to be detected, whereas the Nth sub-image is obtained by interception or cutting processing in a first specified direction over the at least one image to be detected. That is, an interception direction for the image to be detected is changed. In the embodiment, for example, transverse interception is performed at first. When the first data of the Nth sub-image is not the maximum value, it is indicated that there is no possibility that the Nth sub-image is similar to the first reference image. Then, the interception direction for the image to be detected is changed and the image to be detected is intercepted in the longitudinal direction. Both an interception position and ratio may be the same as those for interception in the transverse direction. A corresponding sub-image is obtained. It is judged whether the sub-image is similar to the first reference image or not. Such a process is similar to the abovementioned content, and will not be described.

If the first data of the Nth sub-image is the maximum value, the first attribute value of the Nth sub-image and the first attribute value of the first reference image are determined to meet the predetermined condition. It is determined that the Nth sub-image obtained by intercepting the image to be detected in the transverse direction is very likely to be similar to the first reference image or the image to be detected is very likely to be similar to the first reference image. Then, a difference between the second attribute values of the Nth sub-image and the first reference image is calculated. When the difference between the second attribute value of the Nth sub-image and the second attribute value of the first reference image does not exceed a first predetermined range, for example, a hamming distance between the image fingerprint information of the Nth sub-image and the first reference image is less than or equal to M, the second attribute value of the Nth sub-image and the second attribute value of the first reference image are determined to meet the predetermined condition. Of course, if the difference between the second attribute value of the Nth sub-image and the second attribute value of the first reference image exceeds the first predetermined range, for example, the hamming distance between the image fingerprint information of the Nth sub-image and the first reference image is more than M, the second attribute value of the Nth sub-image and the second attribute value of the first reference image are determined not to meet the predetermined condition. Herein, M is a positive integer, for example, M=5, and may also be another value, which is set according to a practical condition.

At Step 307, when the first attribute value and/or second attribute value of the Nth sub-image and the corresponding attribute value(s) of the first reference image meet the predetermined condition, it is recognized that the image to be detected to which the Nth sub-image belongs is matched with the first reference image.

For example, when the first data of the Nth sub-image is greater than the second data, and/or the hamming distance between the image fingerprint information of the Nth sub-image and the first reference image is less than or equal to M, it is determined that the first attribute value and/or second attribute value of the Nth sub-image and the corresponding attribute value(s) of the first reference image meet the predetermined condition. At this moment, it is certain that the image to be detected to which the Nth sub-image is matched with the first reference image and is a picture similar to the first reference image.

Furthermore, after it is determined that the first attribute value and/or second attribute value of the Nth sub-image and the corresponding attribute value(s) of the first reference image fail to meet the predetermined condition, the method further includes judging whether the Nth interception or cutting processing in the specified direction over the at least one image to be detected is last interception or cutting processing in the specified direction or not.

If the Nth interception or cutting processing in the specified direction over the at least one image to be detected is not the last interception or cutting processing in a first specified direction, (N+1)th interception or cutting processing in the specified direction on the at least one image to be detected is performed to obtain an (N+1)th sub-image. A first attribute value and/or second attribute value in the (N+1)th sub-image is/are acquired. When the first attribute value and/or second attribute value of the (N+1)th sub-image and the corresponding attribute value(s) of the first reference image meet the predetermined condition, it is recognized that the image to be detected to which the (N+1)th sub-image belongs is matched with the first reference image. For example, interception in in the transverse direction is performed at first. (N+1)th interception in the specified direction, such as the transverse direction, is performed on the image to be detected to obtain the (N+1)th sub-image. A color distribution histogram of the (N+1)th sub-image is obtained through the CF algorithm and/or an image fingerprint is obtained through the phash algorithm. It is determined whether the (N+1)th sub-image or the image to be detected to which it belongs is similar to the first reference image or not according to the color distribution histogram and the image fingerprint. A specific process refers to the abovementioned related descriptions about the Nth sub-image.

If the Nth interception or cutting processing in the specified direction over the at least one image to be detected is the last interception or cutting processing in the first specified direction, interception or cutting processing in a second specified direction on the at least one image to be detected is performed. For example, interception in the transverse direction (the first specified direction) is performed on the image to be detected at first. If existence of a sub-image similar to the first reference image is still not judged after interception in the transverse direction is completed according to a certain ratio, it is necessary to successively perform interception in another specified direction such as the longitudinal direction (the second specified direction) according to a predetermined ratio and interception position and determine whether a longitudinally intercepted sub-image is similar to the first reference image or not. If it is still dissimilar, the first reference image is changed, and may be changed by continuously intercepting the first reference image. For example, the first reference image selected for the first time is a part, including pixel points (5, 5)~(165, 165), of the picture A. The first reference image selected for the second time may be a part, including pixel points (10, 5)~(170, 165), of the picture A, and the part of image selected for the second time may be obtained by translating the first reference image selected for the first time by 5 pixel points in the transverse direction. Subsequent processing over the longitudinally intercepted sub-image is similar to the subsequent processing about the sub-image intercepted in the transverse direction, and will not be elaborated herein.

It is important to note that, under the condition that both the first attribute values of the Nth sub-image and the first reference image and the second attribute values of the Nth sub-image and the first reference image meet corresponding predetermined conditions, it is determined whether there is a possibility that the Nth sub-image is similar to the first reference image or not at first through the similarity of the color histograms. When it is determined that there is the possibility that the Nth sub-image is similar to the first reference image through the similarity of the color histograms, it is determined whether there is the possibility that the Nth sub-image is similar to the first reference image or not through the image fingerprint information. If it is determined that there is the possibility that they are similar through both of the foregoing, the Nth sub-image or the image to be detected to which it belongs is determined as a picture similar to the first reference image. Such a manner of combining the two algorithms may prevent pictures with high similarities from being missed, and may also ensure or improve recognition accuracy.

In the embodiment of the present disclosure, the first reference image is acquired at first, and then certain interception or cutting processing is performed on the image to be detected to obtain a sub-image. When the first reference image and the sub-image have similarities in terms of the color distribution information and/or the image fingerprint information, the image to be detected is determined as the image similar to the first reference image. Preferably, when the first reference image and the sub-image have similarities in terms of both the color distribution information and the image fingerprint information, the image to be detected is determined as the image similar to the first reference image. Herein, the color distribution histograms are obtained by means of the CF algorithm and the image fingerprint information is obtained by means of the phash algorithm. Combination of the two algorithms may prevent the pictures with the high similarities from being missed, and may also ensure or improve the recognition accuracy.

Figure 4:
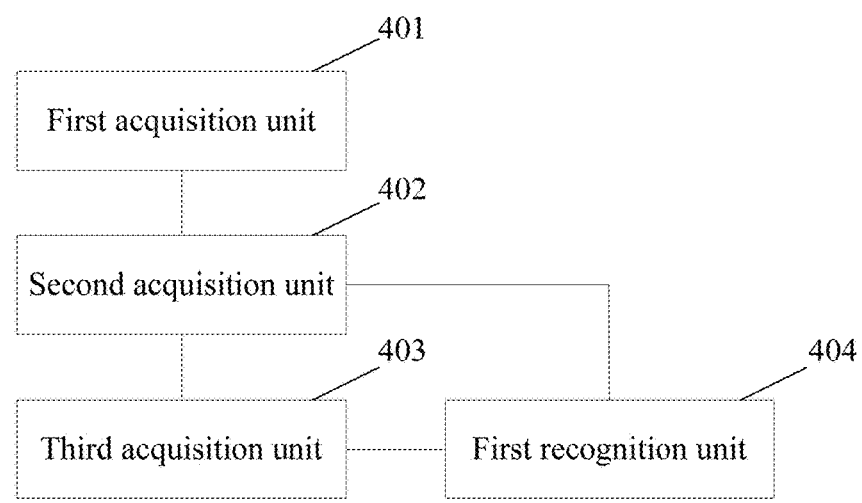
FIG. 4 is a structure diagram illustrating an embodiment of the present disclosure.

FIG. 4 is a structure diagram illustrating a device embodiment. As shown in FIG. 4, the device includes a first acquisition unit 401, a second acquisition unit 402, a third acquisition unit 403 and a first recognition unit 404.

The first acquisition unit 401 is configured to acquire a first reference image.

During a practical application, a picture with a high similarity with a picture A or part of image of the picture A may be found from other pictures. For example, a picture including a certain object such as a peony flower in the picture A is searched from the other pictures. When the picture with the high similarity with the picture A is intended to be searched from the other pictures, the first reference image is the picture A. When the picture with the high similarity with the part of image such as an image of the peony flower in the picture A is intended to be searched from the other pictures, the first reference image is part of image including the peony flower in the picture A.

The first acquisition unit 401 determines a first predetermined image at first, and then performs interception or cutting processing on the first predetermined image to obtain the first reference image according to a second preset rule. The second preset rule at least sets a position and size for interception or cutting processing of the first predetermined image. The first predetermined image may be a local picture, a picture shot by a camera, a picture received from another terminal/server or a picture downloaded from the Internet. For example, the first predetermined image may be the abovementioned picture A. According to a usage requirement, the picture A may be wholly intercepted, and may also be partially intercepted. For example, a 200*200-pixel picture A may be intercepted from a position of a pixel point (0, 0) according to a ratio of 1/5 (40 pixels are removed) to obtain a 160*160-pixel picture including pixel points (0, 0)~(160, 160). Alternatively, a 200*200-pixel picture A may be intercepted from a position of a pixel point (5, 5) according to the ratio of 1/5 to obtain a 160*160-pixel picture including pixel points (5, 5)~(165, 165), which is determined according to a practical usage requirement.

The second acquisition unit 402 is configured to acquire at least one image to be detected, and perform Nth interception or cutting processing in at least one specified direction on the image to be detected to obtain an Nth sub-image in the at least one image to be detected according to a first preset rule, N being a positive integer.

Herein, the image to be detected may be a local picture, a picture shot by the camera, a picture received from the other terminal/server or a picture downloaded from the Internet. The first preset rule at least sets a position and size for the Nth interception or cutting processing of the at least one image to be detected. The Nth sub-image and the first reference image have the same size, and N is a positive integer. A size of the image to be detected may be the same as or different from a size of the first predetermined image. The specified direction is a transverse direction and longitudinal direction of the picture. Preferably, the second acquisition unit 402 may perform interception in the transverse direction at first. When a sub-image intercepted in the transverse direction is not similar to the first reference image, the second acquisition unit 402 performs interception in the longitudinal direction. The size of the Nth sub-image is required to be the same as the size of the first reference image. For example, a picture B includes 200*200 pixels. If the picture is translated by one pixel every time in the transverse direction, the second acquisition unit 402 performs interception from a position of a pixel point (0, 0) according to a ratio of 1/5 (200*1/5=40 pixels are removed) to obtain a 160*160-pixel picture, i.e. first sub-image, including pixel points (0, 0)~(160, 160) during first interception. The second acquisition unit 402 performs interception from a position of a pixel point (1, 0) according to the same ratio of 1/5 to obtain a 160*160-pixel picture, i.e. second sub-image, including pixel points (1, 0)~(161, 160) during second interception, and so on.

The third acquisition unit 403 is configured to acquire first attribute values and/or second attribute values in the first reference image and the Nth sub-image respectively, the first attribute values being configured to represent color distribution information of the images and the second attribute values being configured to represent fingerprint information of the images.

Herein, the first attribute values are color distribution histograms calculated through a CF algorithm, and the second attribute values are the image fingerprint information calculated through a phash algorithm. The third acquisition unit 403 calculates the color distribution histograms and/or image fingerprint information of the first reference image and the Nth sub-image. A specific process of calculating the color distribution histograms and the image fingerprint information refers to related descriptions, and will not be elaborated herein.

The first recognition unit 404 is configured to, when the first attribute value and/or second attribute value of the Nth sub-image and the corresponding attribute value(s) of the first reference image meet a predetermined condition, recognize that the image to be detected to which the Nth sub-image belongs is matched with the first reference image.

Herein, when the first recognition unit 404 determines that the color distribution histogram of the Nth sub-image has a relatively high similarity with the color distribution histogram of the first reference image, and/or an image fingerprint of the Nth sub-image has a relatively high similarity with an image fingerprint of the first reference image, the image to be detected to which the Nth sub-image belongs is determined as an image similar to the first reference image.

In the embodiment of the present disclosure, the first reference image is acquired at first, and then certain interception or cutting processing is performed on the image to be detected to obtain a sub-image. When the first reference image and the sub-image have similarities in terms of the color distribution information and/or the image fingerprint information, the image to be detected is determined as the image similar to the first reference image. The color distribution histograms are obtained by means of the CF algorithm, and the image fingerprint information is obtained by means of the phash algorithm, so that pictures with high similarities may be prevented from being missed, and recognition accuracy may also be ensured or improved.

Figure 5:
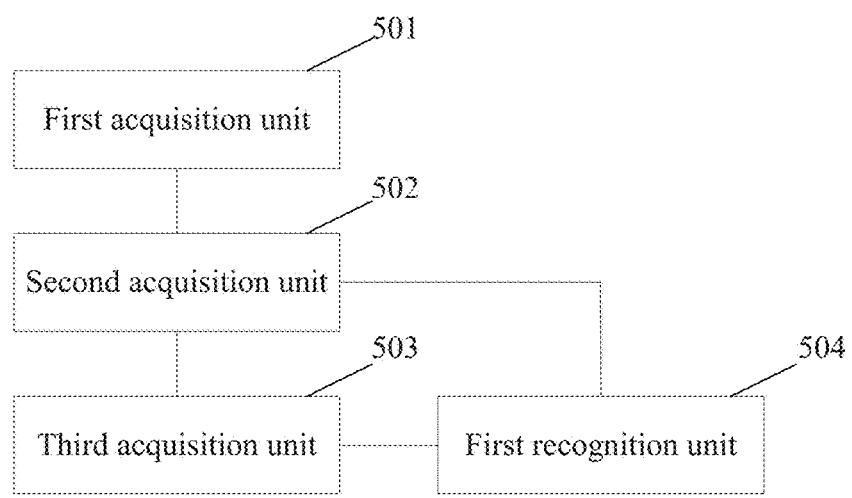
FIG. 5 is a structure diagram illustrating another embodiment of the present disclosure.

FIG. 5 is a structure diagram illustrating another device embodiment. As shown in FIG. 5, the device includes a first acquisition unit 501, a second acquisition unit 502, a third acquisition unit 503 and a first recognition unit 504.

The first acquisition unit 501 is configured to acquire a first reference image.

During a practical application, a picture with a high similarity with a picture A or part of image of the picture A may be found from other pictures. For example, a picture including a certain object such as a peony flower in the picture A is searched from the other pictures. When the picture with the high similarity with the picture A is intended to be searched from the other pictures, the first reference image is the picture A. When the picture with the high similarity with the part of image such as an image of the peony flower in the picture A is intended to be searched from the other pictures, the first reference image is part of image including the peony flower in the picture A.

The first acquisition unit 501 determines a first predetermined image at first, and then performs interception or cutting processing on the first predetermined image to obtain the first reference image according to a second preset rule. The second preset rule at least sets a position and size for interception or cutting processing of the first predetermined image. The first predetermined image may be a local picture, a picture shot by a camera, a picture received from another terminal/server or a picture downloaded from the Internet. For example, the first predetermined image may be the abovementioned picture A. According to a usage requirement, the picture A may be wholly intercepted, and may also be partially intercepted. For example, a 200*200-pixel picture A may be intercepted from a position of a pixel point (0, 0) according to a ratio of 1/5 (40 pixels are removed) to obtain a 160*160-pixel picture including pixel points (0, 0)~(160, 160). Alternatively, a 200*200-pixel picture A may be intercepted from a position of a pixel point (5, 5) according to the ratio of 1/5 to obtain a 160*160-pixel picture including pixel points (5, 5)~(165, 165).

The second acquisition unit 502 is configured to acquire at least one image to be detected, and perform Nth interception or cutting processing in at least one specified direction on the image to be detected to obtain an Nth sub-image in the at least one image to be detected according to a first preset rule, N being a positive integer.

Herein, the image to be detected may be a local picture, a picture shot by the camera, a picture received from the other terminal/server or a picture downloaded from the Internet. The first preset rule at least sets a position and size for the Nth interception or cutting processing of the at least one image to be detected. The Nth sub-image and the first reference image have the same size, and N is a positive integer. A size of the image to be detected may be the same as or different from a size of the first predetermined image. The specified direction is a transverse direction and longitudinal direction of the picture. Preferably, the second acquisition unit 502 may perform interception in the transverse direction at first. When a sub-image intercepted in the transverse direction is not similar to the first reference image, performs interception in the longitudinal direction. The size of the Nth sub-image is required to be the same as the size of the first reference image. For example, a picture B includes 200*200 pixels. If the picture is translated by one pixel every time in the transverse direction, the second acquisition unit 502 performs interception from a position of a pixel point (0, 0) according to a ratio of 1/5 (200*1/5=40 pixels are removed) to obtain a 160*160-pixel picture, i.e. first sub-image, including pixel points (0, 0)~(160, 160) during first interception. The second acquisition unit 502 performs interception from a position of a pixel (1, 0) according to the same ratio of 1/5 to obtain a 160*160-pixel picture, i.e. second sub-image, including pixel points (1, 0)~(161, 160) during second interception, and so on.

The third acquisition unit 503 is configured to acquire first attribute values and/or second attribute values in the first reference image and the Nth sub-image respectively, the first attribute values being configured to represent color distribution information of the images and the second attribute values being configured to represent fingerprint information of the images.

Herein, the first attribute values are color distribution histograms calculated through a CF algorithm, and the second attribute values are the image fingerprint information calculated through a phash algorithm. The third acquisition unit 503 calculates the color distribution histograms and/or image fingerprint information of the first reference image and the Nth sub-image. A specific process of calculating the color distribution histograms and the image fingerprint information refers to related descriptions, and will not be elaborated herein.

The third acquisition unit 503 is further configured to determine first data according to the first attribute values of the first reference image and the Nth sub-image, the first data being a color similarity of the first reference image and the Nth sub-image, and acquire second data, the second data being represented as a maximum value in first data of each sub-image in N−1 sub-images prior to the Nth sub-image.

Herein, the third acquisition unit 503 calculates a similarity value of the first reference image and the Nth sub-image in terms of the color distribution histogram for caching in a caching unit (not shown in FIG. 5) through a cosine similarity algorithm according to the color distribution histograms of the first reference image and the Nth sub-image. Of course, the first data may also be obtained through another algorithm. After the second acquisition unit 502 performs first N−1 interceptions on the image to be detected to obtain the first N−1 sub-images, the third acquisition unit 503 calculates and caches a similarity value of each sub-image in the first N−1 sub-images and the first reference image in the caching unit for subsequent use. The third acquisition unit 503 reads the first data, which has been cached in the caching unit previously, corresponding to the first N−1 sub-images, and calculates the maximum value therein as the second data.

The first recognition unit 504 is configured to determine whether the first attribute value and/or second attribute value of the Nth sub-image and the corresponding attribute value(s) of the first reference image meet a predetermined condition or not according to the first data, the second data, the second attribute value of the first reference image and the second attribute value of the Nth sub-image.

Furthermore, the first recognition unit 504 determines whether the first data of the Nth sub-image in the second data and the first data of the Nth sub-image is the maximum value or not.

If the first data of the Nth sub-image is not the maximum value, the second acquisition unit 502 is triggered to perform interception or cutting processing in a second specified direction on the at least one image to be detected. The Nth sub-image is obtained by interception or cutting processing in a first specified direction over the at least one image to be detected. That is, an interception direction for the image to be detected is changed. In the embodiment, for example, transverse interception is performed at first. When the first data of the Nth sub-image is not the maximum value, it is indicated that there is no possibility that the Nth sub-image is similar to the first reference image. Then, the interception direction for the image to be detected is changed and the image to be detected is intercepted in the longitudinal direction. Both an interception position and ratio may be the same as those for interception in the transverse direction. A corresponding sub-image is obtained. It is judged whether the sub-image is similar to the first reference image or not through the first recognition unit 504. Such a process is similar to the abovementioned content, and will not be described.

If the first recognition unit 504 determines that the first data of the Nth sub-image is the maximum value, the first attribute value of the Nth sub-image and the first attribute value of the first reference image are determined to meet the predetermined condition. It is determined that the Nth sub-image obtained by intercepting the image to be detected in the transverse direction is very likely to be similar to the first reference image or the image to be detected is very likely to be similar to the first reference image. Then, the first recognition unit 504 calculates a difference between the second attribute values of the Nth sub-image and the first reference image. When the difference between the second attribute value of the Nth sub-image and the second attribute value of the first reference image does not exceed a first predetermined range, for example, a hamming distance between the image fingerprint information of the Nth sub-image and the first reference image is less than or equal to M, the second attribute value of the Nth sub-image and the second attribute value of the first reference image are determined to meet the predetermined condition. Of course, if the first recognition unit 504 calculates the difference between the second attribute value of the Nth sub-image and the second attribute value of the first reference image to exceed the first predetermined range, for example, the hamming distance between the image fingerprint information of the Nth sub-image and the first reference image is more than M, the second attribute value of the Nth sub-image and the second attribute value of the first reference image are determined not to meet the predetermined condition. Herein, M is a positive integer, for example, M=5, and may also be another value, which is set according to a practical condition.

The first recognition unit 504 is configured to, when the first attribute value and/or second attribute value of the Nth sub-image and the corresponding attribute value(s) of the first reference image meet the predetermined condition, recognize that the image to be detected to which the Nth sub-image belongs is matched with the first reference image.

Furthermore, after the first recognition unit 504 determines that the first attribute value and/or second attribute value of the Nth sub-image and the corresponding attribute value(s) of the first reference image do not meet the predetermined condition, the first recognition unit 504 judges whether the Nth interception or cutting processing in the specified direction over the at least one image to be detected is last interception or cutting processing in the specified direction or not.

If the first recognition unit 504 judges that the Nth interception or cutting processing in the specified direction over the at least one image to be detected is not the last interception or cutting processing in a first specified direction, the second acquisition unit 502 is triggered to perform (N+1)th interception or cutting processing in the specified direction on the at least one image to be detected to obtain an (N+1)th sub-image. Correspondingly, the third acquisition unit 503 acquires a first attribute value and/or second attribute value in the (N+1)th sub-image. When determining that the first attribute value and/or second attribute value of the (N+1)th sub-image and the corresponding attribute value(s) of the first reference image meet the predetermined condition, the first recognition unit 504 recognizes that the image to be detected to which the (N+1)th sub-image belongs is matched with the first reference image. Herein, the second acquisition unit 502 performs (N+1)th interception in the specified direction, such as the transverse direction, on the image to be detected to obtain the (N+1)th sub-image. The third acquisition unit 503 obtains a color distribution histogram of the (N+1)th sub-image through the CF algorithm and/or obtains an image fingerprint through the phash algorithm. The first recognition unit 504 determines whether the (N+1)th sub-image or the image to be detected to which it belongs is similar to the first reference image or not according to the color distribution histogram and the image fingerprint. A specific process refers to the abovementioned related descriptions about the Nth sub-image.

If the first recognition unit 504 judges that the Nth interception or cutting processing in the specified direction over the at least one image to be detected is the last interception or cutting processing in the first specified direction, the second acquisition unit 502 is triggered to perform interception or cutting processing in a second specified direction on the at least one image to be detected. For example, interception in the transverse direction (the first specified direction) is performed on the image to be detected at first. If the first recognition unit 504 still does not judge existence of a sub-image similar to the first reference image after the second acquisition unit 502 completes interception in the transverse direction according to a certain ratio, the second acquisition unit 502 is triggered to successively perform interception in the second specified direction such as the longitudinal direction according to a predetermined ratio and interception position. The first recognition unit 504 determines whether a longitudinally intercepted sub-image is similar to the first reference image or not. If it is still dissimilar, a first switching unit (not shown in FIG. 5) is triggered to change the first reference image, and may change it by continuously intercepting the first reference image. For example, the first reference image selected for the first time is a part, including pixel points (5, 5)~(165, 165), of the picture A. The first reference image selected for the second time may be a part, including pixel points (10, 5)~(170, 165), of the picture A, and the part of image selected for the second time may be obtained by translating the first reference image selected for the first time by 5 pixel points in the transverse direction. Subsequent processing over the longitudinally intercepted sub-image is similar to the subsequent processing about the sub-image intercepted in the transverse direction, and will not be elaborated herein.

It is important to note that, under the condition that both the first attribute values of the Nth sub-image and the first reference image and the second attribute values of the Nth sub-image and the first reference image meet corresponding predetermined conditions, it is determined whether there is a possibility that the Nth sub-image is similar to the first reference image or not at first through the similarity of the color histograms. When it is determined that there is the possibility that the Nth sub-image is similar to the first reference image through the similarity of the color histograms, it is determined whether there is the possibility that the Nth sub-image is similar to the first reference image or not through the image fingerprint information. If it is determined that there is the possibility that they are similar through both of the foregoing, the Nth sub-image or the image to be detected to which it belongs is determined as a picture similar to the first reference image. Such a manner of combining the two algorithms may prevent pictures with high similarities from being missed, and may also ensure or improve recognition accuracy.

In the embodiment of the present disclosure, the first reference image is acquired at first, and then certain interception or cutting processing is performed on the image to be detected to obtain a sub-image. When the first reference image and the sub-image have similarities in terms of the color distribution information and/or the image fingerprint information, the image to be detected is determined as the image similar to the first reference image. Preferably, when the first reference image and the sub-image have similarities in terms of both the color distribution information and the image fingerprint information, the image to be detected is determined as the image similar to the first reference image. Herein, the color distribution histograms are obtained by means of the CF algorithm and the image fingerprint information is obtained by means of the phash algorithm. Combination of the two algorithms may prevent the pictures with the high similarities from being missed, and may also ensure or improve the recognition accuracy.

Figure 6A:
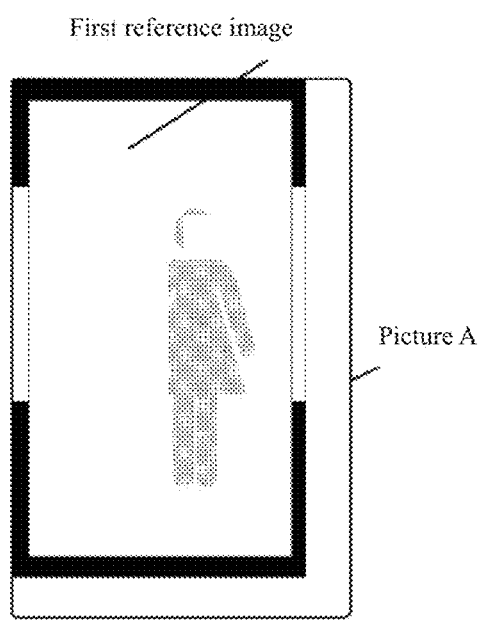
FIGS. 6(a)~6(c) are schematic diagrams illustrating an application according to an embodiment of the present disclosure.

The embodiments of the present disclosure will be further described below with reference to an application scenario shown in FIGS. 6(a)~6(c).

Figure 6B:
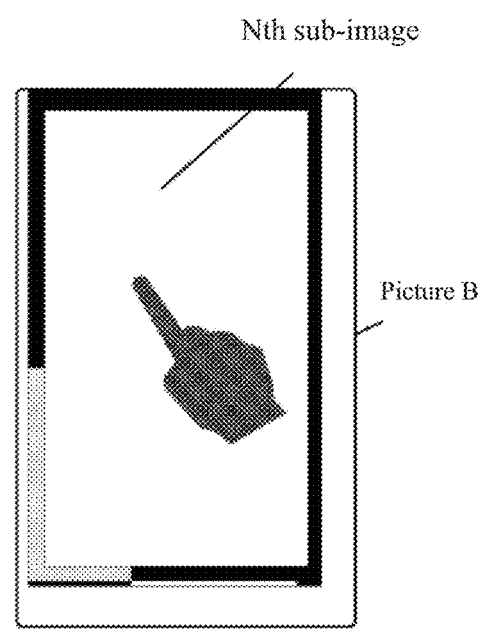
Figure 6C:
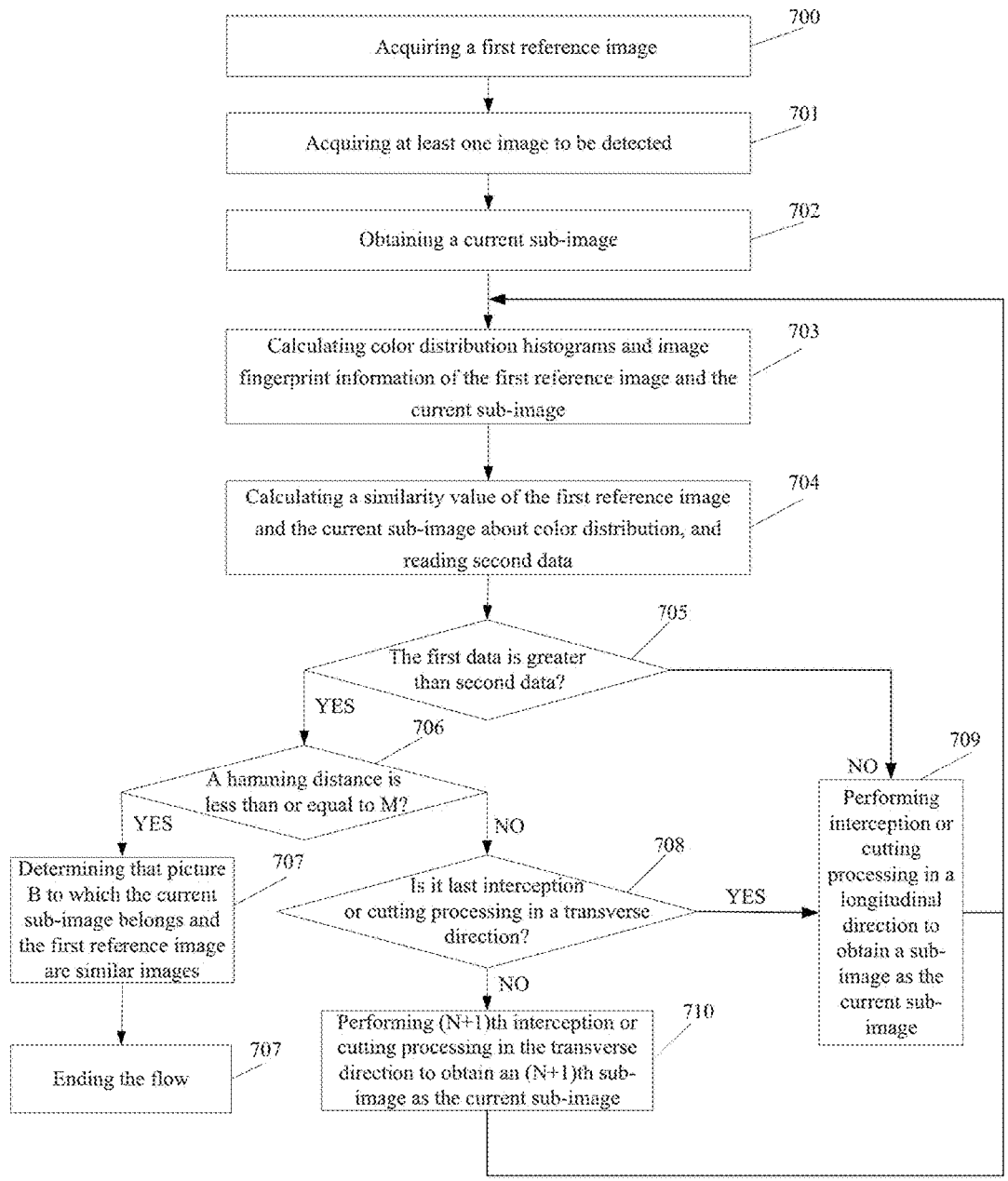

As shown in FIG. 6(c), a user 1 intends to search out all of photos similar to a picture A in a photo library in a terminal of the user 1. The picture A is a photo of the user 1. The user 1 wants to find all of her photos in the photo library.

at Step 700, a first reference image is acquired.

The photo library of the terminal is started and the picture A is selected. As shown in FIG. 6(a), it is supposed that the terminal supports full-screen display of a 200*200-pixel picture A (a first predetermined image). The picture A includes the user 1. Interception is performed from a position of a pixel point (0, 0) (i.e. a left upper corner of the picture) according to a ratio of 1/5 (40 pixels are removed) to obtain a 160*160-pixel picture, i.e. the first reference image, including pixel points (0, 0)~(160, 160) (shown by a grey black box in FIG. 6(a)). Herein, the first reference image is an intercepted part of the picture A only including the user 1. The first reference image is stored in a caching unit of the terminal.

At Step 701, at least one image to be detected is acquired.

All of the photos in the photo library of the terminal are scanned one by one and then it is judged how similar as the first reference image each of the photos is.

Herein, a picture B is acquired as the image to be detected shown in FIG. 6(b).

At Step 702, Nth interception or cutting processing in a transverse direction on the image to be detected is performed to obtain a current sub-image (Nth sub-image) according to a first preset rule.

Herein, the image to be detected (which is shot) is the picture B (including a hand) shown in FIG. 6(b). It is supposed that the picture B also includes 200*200 pixels, is also intercepted in the transverse direction according to the ratio of 1/5 and is translated by one pixel right along the transverse direction during each interception. For example, interception is performed for the first time from a pixel point (0, 0) according to the ratio of 1/5, interception is performed for the second time from a pixel point (1, 0) according to the ratio of 1/5, and interception is performed for the third time from a pixel point (2, 0) according to the ratio of 1/5.

It is supposed that fourth interception is currently performed to obtain a fourth sub-image including pixel points (4, 0)~(164, 160) of the picture B, shown by a grey black box in FIG. 6(b).

It is judged whether the picture B to which the current sub-image (N=4th sub-image) is an image similar to the first reference image or not by the following steps.

At Step 703, color distribution histograms of the first reference image and the current sub-image are calculated through a CF algorithm, and image fingerprint information of the first reference image and the current sub-image is calculated through a phash algorithm.

At Step 704, a similarity value of the first reference image and the current sub-image is calculated in terms of color distribution according to the color distribution histograms of the first reference image and the current sub-image, and second data is read.

Herein, a similarity of the two images in terms of color distribution may be obtained through a cosine similarity algorithm and the similarity is the first data. If N=4, first data of each sub-image in a first sub-image to a third sub-image, after being calculated, is cached in a caching unit. At this moment, these values are read from the caching unit, a maximum value therein is calculated, and the second data is the maximum value.

At Step 705, it is judged whether the first data is greater than the second data.

When the first data is judged to be greater than the second data, Step 706 is executed. When the first data is judged to be smaller than the second data, Step 709 is executed.

Herein, the first data is greater than the second data. That is, the current sub-image of the picture B is very similar as the first reference image in terms of color distribution. It is initially judged that the picture B includes the user 1 and thus is an expected picture. Next, Step 706 is performed to judge the difference between these two images in terms of image fingerprint information.

At Step 706, a difference between image fingerprint information of the current sub-image and the first reference image is calculated.

If a hamming distance between the image fingerprint information of the Nth sub-image and the first reference image is less than or equal to M, for example, M=5, it is determined that the difference between the two images in terms of the image fingerprint information is relatively small, and Step 707 is executed.

If the hamming distance between the image fingerprint information of the Nth sub-image and the first reference image is more than M, it is determined that the difference of the two images in terms of the image fingerprint information is relatively large, and Step 708 is executed.

Herein, the hamming distance between the current Nth sub-image of the picture B (including the hand) and the first reference image of the picture A (including the user 1) is greater than M (M=5). Thus, the difference between them is distinct and thus it is determined that the current Nth sub-image of the picture B is not similar as the first reference image of the picture A. At this time, Step 708 is performed. Other parts of the picture B are intercepted and judged whether the user 1 is included.

At Step 707, it is determined that the picture B to which the current sub-image belongs is an image similar to the first reference image, and the flow ends.

Herein, the Nth sub-image may also be determined as an image similar to the first reference image.

At Step 708, it is judged whether the Nth interception or cutting processing in the transverse direction over the at least one image to be detected is last interception or cutting processing in the transverse direction or not. If YES, Step 709 is executed. If NO, Step 710 is executed.

At Step 709, interception or cutting processing in a longitudinal direction on the at least one image to be detected is performed to obtain a sub-image intercepted in the longitudinal direction as the current sub-image, and Step 703 is executed again.

At Step 710, (N+1)th interception or cutting processing in the transverse direction on the at least one image to be detected is performed to obtain an (N+1)th sub-image as the current sub-image, and Step 703 is executed again.

At last, the sub-images of the picture B obtained by the last interception in both the transverse and longitudinal directions are determined not to be similar as the first reference image. It is determined that the picture B does not include the user 1 and thus is not what the user 1 expects.

According to the above steps, other photos in the photo library are scanned until each of the photos is determined whether to include the user 1. All of the photos which are determined to include the user 1 in the photo library are displayed.

By the method, although the picture B is at first determined to include the user 1 due to the high similarity in terms of color distribution, the similarity in terms of the image fingerprint information of them is further checked, thereby excluding the picture B. Recognition accuracy is improved.

As can be seen, in the embodiments of the present disclosure, the first reference image is intercepted or cut from the first predetermined image. The Nth interception or cutting is performed on the image to be detected to obtain the Nth sub-image. If the Nth sub-image and the first reference image have a very high similarity in terms of color distribution histogram, it is determined whether the Nth sub-image and the first reference image have any similarity or not from the image fingerprint information. If similarities in terms of both color distribution and image fingerprint exist, the image to be detected to which the Nth sub-image belongs and the first reference image are determined to be similar images. Herein, the color distribution histograms are obtained by means of the CF algorithm and the image fingerprints are obtained by means of the phash algorithm. Combining the two algorithms and adopting the CF algorithm as a primary screening algorithm (a picture which may be similar to the first reference image is primarily screened) may prevent pictures with high similarities from being missed. The phash algorithm adopted for a further confirmation method may ensure or improve recognition accuracy.

It is noted that the device may be located in electronic equipment such as a PC, and may also be located in portable electronic equipment such as a PAD, a tablet computer and a laptop computer, and may further be located in an intelligent mobile terminal such as a mobile phone. Descriptions made herein do not form any limit. The image information recognition processing device (electronic equipment) which integrates each unit function or of which each unit function is split at least includes a database configured to store data and a processor configured for data processing, or includes a storage medium arranged in a server or an independently arranged storage medium.

Herein, the processor configured for data processing may be implemented by adopting a microprocessor, a Central Processing Unit (CPU), a Digital Signal Processor (DSP) or a Field-Programmable Gate Array (FPGA) when executing processing. The storage medium includes operating instructions. The operating instructions may be computer-executable codes, and each step in the abovementioned image information recognition processing method flow of the embodiment of the present disclosure is implemented through the operating instructions.

Figure 7:
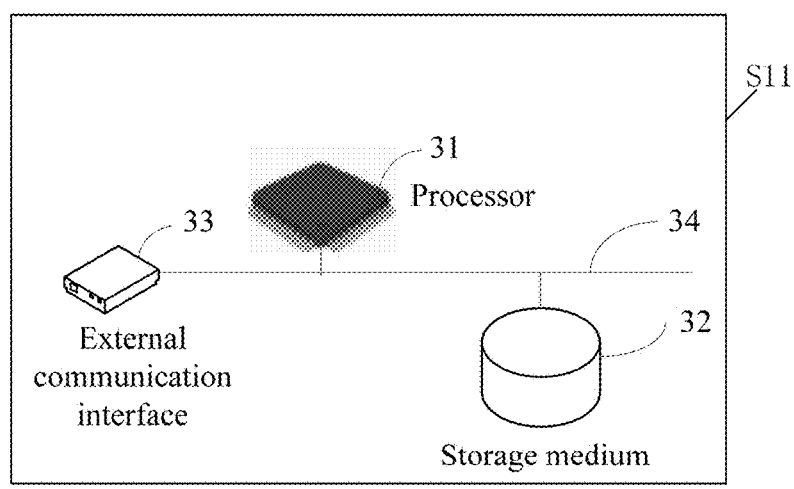
FIG. 7 is a hardware structure diagram of a device according to an embodiment of the present disclosure.

An example of the device serving as a hardware entity S11 is shown in FIG. 7. The device includes a processor 31, a storage medium 32 and at least one external communication interface 33. The processor 31, the storage medium 32 and the external communication interface 33 are all connected via a bus 34.

It is noted that the above descriptions about the image information recognition processing device are similar to the above method descriptions and include beneficial effect the same as the method, which will not be elaborated. Technical details undisclosed in the device embodiment of the present disclosure refer to the descriptions in the abovementioned embodiment of the present disclosure.

It is noted that the image information recognition processing devices and methods described herein may be applied in the various application scenarios for processing images, such as, an application or a client for clearing similar pictures or photos, an application or a client searching for similar pictures or photos, a camera or a terminal with a camera function or the like. For example, there is a plurality of pictures in a computer and similar or same pictures therein may be found by means of the image information recognition processing devices and methods described herein. Another example may be a mobile terminal with a camera function. A user continuously shoots several pictures with the mobile terminal and similar pictures therein may be cleared by means of the image information recognition processing devices and methods described herein.

Correspondingly, the embodiments of the present disclosure further provide a computer storage medium having computer-executable instructions stored therein, the computer-executable instructions being configured to execute the abovementioned image information recognition processing method.

When being implemented in form of software function module and sold or used as an independent product, the integrated module of the embodiment of the present disclosure may also be stored in a computer-readable storage medium. Based on such an understanding, those skilled in the art should know that the embodiment of the present disclosure may be provided as a method, a system or a computer program product. Therefore, the present disclosure may adopt a form of pure hardware embodiment, pure software embodiment or combined software and hardware embodiment, moreover, the present disclosure may adopt a form of computer program product implemented on one or more computer-available storage media including computer-available program codes, and the storage medium includes, but not limited to, a U disk, a mobile hard disk, a Read-Only Memory (ROM), a disk memory, a Compact Disc Read-Only Memory (CD-ROM), an optical memory and the like.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Although the preferred embodiments of the present disclosure have been described, those skilled in the art may make additional variations and modifications to these embodiments once learning about the basic creative concept. Therefore, the appended claims are intended to be explained to include the preferred embodiments and all variations and modifications falling within the scope of the present disclosure.

The invention claimed is:

1. An image information recognition processing method, executed by one or more processors, comprising:
   acquiring a first reference image;
   acquiring at least one image to be detected, and performing Nth interception or cutting processing on one of the at least one image to be detected in at least one specified direction to obtain an Nth sub-image in one of the at least one image to be detected according to a first preset rule, N being a positive integer;
   acquiring first attribute values and/or second attribute values of the first reference image and the Nth sub-image respectively, the first attribute values being configured to represent color distribution information of the first reference image and the Nth sub-image and the second attribute values being configured to represent fingerprint information of the first reference image and the Nth sub-image;
   determining first data according to the first attribute values of the first reference image and the Nth sub-image, the first data being a color similarity of the first reference image and the Nth sub-image;
   acquiring second data, the second data being a maximum value in first data of each sub-image in N−1 sub-images prior to the Nth sub-image; and
   determining whether the first attribute value and/or second attribute value of the Nth sub-image and the corresponding attribute value(s) of the first reference image meet the predetermined condition or not according to the first data, the second data, the second attribute value of the first reference image and the second attribute value of the Nth sub-image.

2. The method according to claim 1, wherein acquiring the first reference image comprises:
   determining a first predetermined image; and
   performing interception or cutting processing on the first predetermined image to obtain the first reference image according to a second preset rule,
   wherein the second preset rule at least sets a position and size for interception or cutting processing of the first predetermined image.

3. The method according to claim 1, wherein the first preset rule at least sets a position and size for the Nth interception or cutting processing of the at least one image to be detected; and the Nth sub-image has the same size as the first reference image.

4. The method according to claim 1, wherein determining whether the first attribute value and/or second attribute value of the Nth sub-image and the corresponding attribute value(s) of the first reference image meet the predetermined condition or not according to the first data, the second data, the second attribute value of the first reference image and the second attribute value of the Nth sub-image comprises:
   determining whether the first data of the Nth sub-image in the second data and the first data of the Nth sub-image is a maximum value or not;
   when it is determined that the first data of the Nth sub-image is the maximum value, determining that the first attribute value of the Nth sub-image and the first attribute value of the first reference image meet the predetermined condition;
   calculating a difference between the second attribute values of the Nth sub-image and the first reference image; and
   when the difference between the second attribute value of the Nth sub-image and the second attribute value of the first reference image does not exceed a first predetermined range, determining that the second attribute value of the Nth sub-image and the second attribute value of the first reference image meet the predetermined condition.

5. The method according to claim 4, further comprising:
   when the difference between the second attribute value of the Nth sub-image and the second attribute value of the first reference image exceeds the first predetermined range, determining that the second attribute value of the Nth sub-image and the second attribute value of the first reference image do not meet the predetermined condition.

6. The method according to claim 5, after determining that the first attribute value and/or second attribute value of the Nth sub-image and the corresponding attribute value(s) of the first reference image do not meet the predetermined condition, the method further comprising:
  determining whether the Nth interception or cutting processing in one of the at least one specified direction over one of the at least one image to be detected is the last interception or cutting processing in the specified direction or not;
  if the Nth interception or cutting processing in one of the at least one specified direction over one of the at least one image to be detected is not the last interception or cutting processing in the specified direction, performing (N+1)th interception or cutting processing in the specified direction on one of the at least one image to be detected to obtain an (N+1)th sub-image;
  acquiring a first attribute value and/or second attribute value in the (N+1)th sub-image; and
  when the first attribute value and/or second attribute value of the (N+1)th sub-image and the corresponding attribute value(s) of the first reference image meet the predetermined condition, recognizing that the image to be detected to which the (N+1)th sub-image belongs is matched with the first reference image.

7. The method according to claim 6, further comprising:
  if the Nth interception or cutting processing over one of the at least one image to be detected is determined to be the last interception or cutting processing in a first specified direction, performing interception or cutting processing in a second specified direction on one of the at least one image to be detected.

8. The method according to claim 4, further comprising:
  when it is determined that the first data of the Nth sub-image is not the maximum value,
  performing interception or cutting processing in a second specified direction on one of the at least one image to be detected, the Nth sub-image being obtained by the interception or cutting processing in a first specified direction over one of the at least one image to be detected.

9. An image information recognition processing device, comprising:
  one or more processors; and
  memory, configure to store instructions executable by the one or more processors to implement
  acquiring a first reference image;
  acquiring at least one image to be detected, and performing Nth interception or cutting processing on one of the at least one image to be detected in at least one specified direction to obtain an Nth sub-image in one of the at least one image to be detected according to a first preset rule, N being a positive integer;
  acquiring first attribute values and/or second attribute values of the first reference image and the Nth sub-image respectively, the first attribute values being configured to represent color distribution information of the first reference image and the Nth sub-image and the second attribute values being configured to represent fingerprint information of the first reference image and the Nth sub-image;
  determining first data according to the first attribute values of the first reference image and the Nth sub-image, the first data being a color similarity of the first reference image and the Nth sub-image, and
  acquiring second data, the second data being a maximum value in first data of each sub-image in N−1 sub-images prior to the Nth sub-image; and
  determining whether the first attribute value and/or second attribute value of the Nth sub-image and the corresponding attribute value(s) of the first reference image meet the predetermined condition or not according to the first data, the second data, the second attribute value of the first reference image and the second attribute value of the Nth sub-image.

10. The device according to claim 9, wherein acquiring the first reference image comprises:
  determining a first predetermined image; and
  performing interception or cutting processing on the first predetermined image to obtain the first reference image according to a second preset rule,
  wherein the second preset rule at least sets a position and size for interception or cutting processing of the first predetermined image.

11. The device according to claim 9, wherein the first preset rule at least sets a position and size for the Nth interception or cutting processing of the at least one image to be detected; and the Nth sub-image has the same size as the first reference image.

12. The device according to claim 9, wherein determining whether the first attribute value and/or second attribute value of the Nth sub-image and the corresponding attribute value(s) of the first reference image meet the predetermined condition or not according to the first data, the second data, the second attribute value of the first reference image and the second attribute value of the Nth sub-image comprises:
  determining whether the first data of the Nth sub-image in the second data and the first data of the Nth sub-image is a maximum value or not;
  when it is determined that the first data of the Nth sub-image is the maximum value, determining that the first attribute value of the Nth sub-image and the first attribute value of the first reference image meet the predetermined condition;
  calculating a difference between the second attribute values of the Nth sub-image and the first reference image; and
  when the difference between the second attribute value of the Nth sub-image and the second attribute value of the first reference image does not exceed a first predetermined range, determining that the second attribute value of the Nth sub-image and the second attribute value of the first reference image meet the predetermined condition.

13. The device according to claim 12, wherein the one or more processors further implement:
  when the difference between the second attribute value of the Nth sub-image and the second attribute value of the first reference image exceeds the first predetermined range, determining that the second attribute value of the Nth sub-image and the second attribute value of the first reference image do not meet the predetermined condition.

14. The device according to claim 13, the one or more processors further implement determining whether the Nth interception or cutting processing in one of the at least one specified direction over one of the at least one image to be detected is the last interception or cutting processing in the specified direction or not, and
  if the Nth interception or cutting processing in one of the at least one specified direction over one of the at least one image to be detected is not the last interception or cutting processing in the specified direction, triggering to perform (N+1)th interception or cutting processing in the specified direction on one of the at least one image to be detected to obtain an (N+1)th sub-image;

acquiring a first attribute value and/or second attribute value in the (N+1)th sub-image; and when the first attribute value and/or second attribute value of the (N+1)th sub-image and the corresponding attribute value(s) of the first reference image meet the predetermined condition, recognizing that the image to be detected to which the (N+1)th sub-image belongs is matched with the first reference image.

15. The device according to claim 14, the one or more processors further implement:

if the Nth interception or cutting processing over one of the at least one image to be detected is determined to be the last interception or cutting processing in a first specified direction, triggering to perform interception or cutting processing in a second specified direction on one of the at least one image to be detected.

16. The device according to claim 12, the one or more processors further implement:

when determining that the first data of the Nth sub-image is not the maximum value, triggering to perform interception or cutting processing in a second specified direction on one of the at least one image to be detected, the Nth sub-image being obtained by the interception or cutting processing in a first specified direction over one of the at least one image to be detected.

17. A non-transitory computer storage medium having computer-executable instructions stored therein, the computer-executable instructions being configured to execute an image information recognition processing method, the method comprising:

acquiring a first reference image;

acquiring at least one image to be detected, and performing Nth interception or cutting processing on one of the at least one image to be detected in at least one specified direction to obtain an Nth sub-image in one of the at least one image to be detected according to a first preset rule, N being a positive integer;

acquiring first attribute values and/or second attribute values of the first reference image and the Nth sub-image respectively, the first attribute values being configured to represent color distribution information of the first reference image and the Nth sub-image and the second attribute values being configured to represent fingerprint information of the first reference image and the Nth sub-image;

determining first data according to the first attribute values of the first reference image and the Nth sub-image, the first data being a color similarity of the first reference image and the Nth sub-image, and acquiring second data, the second data being a maximum value in first data of each sub-image in N−1 sub-images prior to the Nth sub-image; and determining whether the first attribute value and/or second attribute value of the Nth sub-image and the corresponding attribute value(s) of the first reference image meet the predetermined condition or not according to the first data, the second data, the second attribute value of the first reference image and the second attribute value of the Nth sub-image.

* * * * *